Feb. 27, 1940.    J. W. BRYCE    2,192,003
ACCOUNTING MACHINE
Filed Oct. 12, 1934    7 Sheets—Sheet 1

INVENTOR
James W. Bryce
BY
Cooper, Kerr & Dunham
ATTORNEYS

Feb. 27, 1940.　　　　J. W. BRYCE　　　　2,192,003
ACCOUNTING MACHINE
Filed Oct. 12, 1934　　　　7 Sheets-Sheet 2

FIG.1a.

INVENTOR
James W. Bryce
BY
Cooper, Kerr & Dunham
ATTORNEYS

Feb. 27, 1940.　　　J. W. BRYCE　　　2,192,003
ACCOUNTING MACHINE
Filed Oct. 12, 1934　　　7 Sheets-Sheet 3

Feb. 27, 1940.                J. W. BRYCE                2,192,003
                          ACCOUNTING MACHINE
                          Filed Oct. 12, 1934        7 Sheets-Sheet 6

FIG. 6.

Patented Feb. 27, 1940

2,192,003

UNITED STATES PATENT OFFICE 2,192,003

ACCOUNTING MACHINE

James W. Bryce, Bloomfield, N. J., assignor to International Business Machines Corporation, New York, N. Y., a corporation of New York Application October 12, 1934, Serial No. 748,056

14 Claims. (Cl. 235—61)

This invention relates to improvements in accounting machines and more particularly to multiplying accounting machines. Previous multiplying machines are generally of two types, i. e. (1) over and over addition machines; and (2) partial product machines. The former class of machine is relatively simple in construction but is usually slow in operation on account of the multiplicity of operations required to enter a multiplicand a multiplicity of times in accordance with the amount of the multiplier. The latter type of machine is relatively more complicated in construction but is relatively more rapid in operation.

The present invention has for one of its objects the provision of an improved type of multiplying machine which will have the advantages of both of the foregoing types of machines without having the disadvantageous features thereof.

Further objects of the present invention reside in the provision of a novel type of multiplying machine which obtains products by a process of addition which is carried out in a novel manner to expedite the obtaining of a product of two numbers entered into the machine.

A further object of the present invention resides in the provision of a multiplying accounting machine adapted to effect multiplication by first setting up all possible sub-products based upon an entered multiplicand (nine such sub-products being used in the present embodiment where the machine works on a tens notation) and to thereafter obtain the complete product by selecting and adding together one or more of such previously set up sub-products.

A further object of the present invention resides in the provision of a multiplying accounting machine adapted to effect multiplication by addition methods which includes the accumulating together in one accumulator of the total of one or more sub-products which are selected according to the entered multiplier.

A further object of the present invention resides in the provision of novel means for setting up and rendering available for readout the required set of sub-products while employing for the purpose accumulators less in number than the number of sub-products which may be required in a possible computation.

A further object of the present invention resides in the provision of a machine in which the construction is simplified and improved for ease in assembly and maintenance.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

Before describing the construction of the machine to which the present invention is shown applied, the general principles under which the machine operates and the general mode of operation will be set forth.

According to the present invention the machine carries out multiplication in the following manner. The multiplier and multiplicand are first entered into the machine. One multiplier entry receiving device is provided and according to the present embodiment six multiplicand entry receiving devices are also provided. Upon the multiplicand entry itself there is a concurrent entry of the multiplicand into five of the multiplicand entry receiving devices. The arrangement of certain of these multiplicand entry receiving devices is such that upon the entry of the multiplicand therein a setup is made of representations for a subsequent readout of the multiplicand itself and a setup of representations is also made for subsequent readout of the multiplicand doubled or multiplied by two. Thereafter automatic machine operations on the second machine cycle cause the readout of the doubled multiplicand amount and the entry of such amount into certain of the multiplicand entry receiving devices. Thus double the amount of the multiplicand is entered into the MC—3 entry device so that this device now has set up therein three times the amount of the multiplicand, this entry device having previously received an entry of the multiplicand itself. Likewise double the amount of the multiplicand is entered into the MC—4 receiving device, double the amount of the multiplicand is entered into the MC—5 receiving device, which had received a previous entry of the multiplicand itself, and double the amount of the multiplicand is entered into the MC—9 receiving device which has likewise previously received an entry of the multiplicand itself. Thereafter upon the third machine cycle there is a further readout of double the multiplicand from one entry receiving device and an entry of such amount into other of the receiving devices and during the same cycle there is a readout of six times the amount of the multiplicand from the doubling readout section of the MC—3 receiving device and an entry of such amount into other of such receiving devices. After the third cycle has been completed, the machine will have set up upon the multiplicand entry receiving devices respectively, the multiplicand times one, the multiplicand times three, the multiplicand times four, the multiplicand times five, the multiplicand times seven and the multiplicand times nine and such sub-products may be read out therefrom. The readout structure associated with certain of the entry receiving devices also will give available readouts of twice the multiplicand, six times the multiplicand and eight times the multiplicand. Accordingly, after the setting has been made any multiple of the multiplicand from one to nine is available for use as a possible sub-product in the subsequent computation. The machine thereafter automatically uses the entered multiplier to control readout operations from the various readout sections of the various multiplicand entry receiving devices and the entry of such multiple multiplicand amounts or sub-products into the product accumulator.

To illustrate—if the multiplier in the units order be three, there would be a readout of three times the amount of the multiplicand from the readout associated with the MC—3 receiving device. Likewise, if the multiplier was six, the readout would be from the "doubled" section of this same receiving device, six times the amount of the multiplicand being available for reading out from that section. By using a number of the so-called "doubling" readout sections, it is possible to set up representations of nine sub-products upon less than nine entry receiving devices, viz. six. The number of sub-products required depends upon the notation involved in the computation or more exactly, the number of digits in the notation. In the present embodiment the tens notation is employed with nine digits so nine sub-products are available upon the nine readout sections of the six accumulator type of multiplicand entry receiving devices. Three readouts are of doubled type for readout of the multiplicand times two, times six and times eight. The times five, seven and nine readouts are of the single straight type and those associated with the MC—1, the MC—3 and the MC—4 entry receiving devices are of dual type with a straight readout section and a "doubling" readout section. United States Patent No. 2,045,437 shows a readout with intermediate gearing in Fig. 16. It will be understood, however, that the superimposed readout is of the customary dual type usually used on MC readouts, that is to say, there are two brushes driven by a single denominational order setting device.

The accounting machine to which the present invention is shown as applied, so far as the various units and the manner of drive is concerned, is substantially the same as the machine shown and described in United States patents to Cunningham, No. 1,933,714 and Oldenboom, No. 1,944,665, to which reference may be had for a fuller description of the general operation of the various units and the manner of drive. There are certain differences in the present construction over the machine shown in the above mentioned patents which will be briefly alluded to here.

In lieu of providing a direct drive for the contact roll 87, a creeping drive is provided of the type shown and described in the United States application of George F. Daly, Serial No. 643,663, filed November 21, 1932. The creeping drive includes supplemental gearing 81a, 81b, 81c and 81d for driving the contact roll 87 with a creeping movement. Such creeping drive is also shown and described in United States Patent No. 1,944,665. The machine includes an entry receiving device for the multiplier, designated MP on Fig. 1. On this figure there is also shown an accumulator for receiving accumulations of complete sub-products, designated PR. For receiving the multiplicand and multiples of such multiplicand, six multiplicand entry receiving devices are provided. These are of the accumulator form and are designated MC—1 and MC—3 on Fig. 2 and MC—4, MC—5, MC—7 and MC—9 on Fig. 1a. These various accumulators are driven in the same manner as correspondingly located accumulator units in the Cunningham patent above referred to and there is a reset drive generally similar to that shown in the Cunningham patent.

Figure 1:
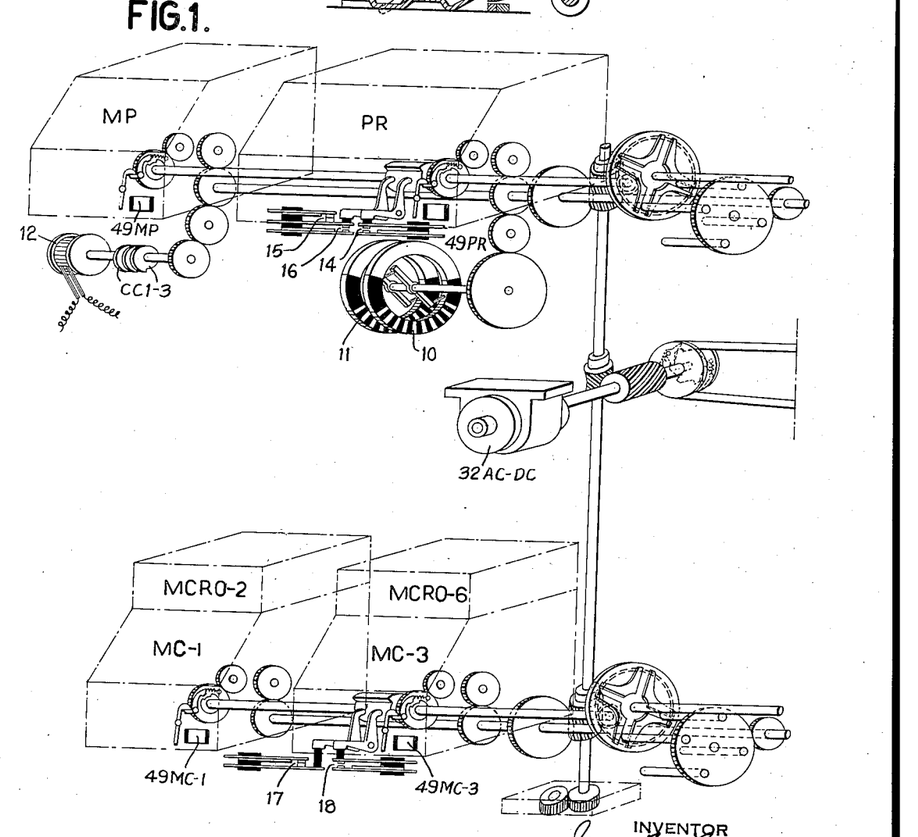
Figures 1 and 1a, taken together, show somewhat diagrammatically the driving mechanism of the machine and the various sections thereof.
Figure 1A:
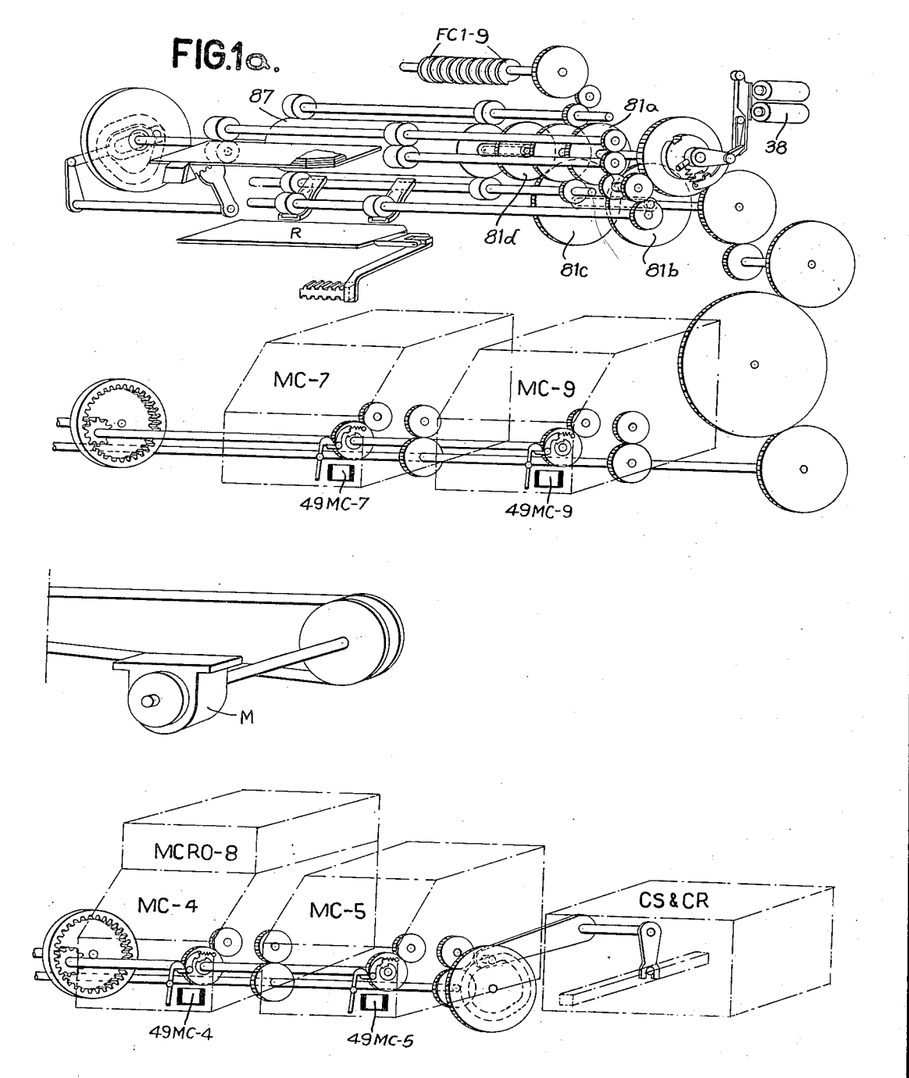

The machine also includes a column shift and control relay section designated CS and CR in Fig. 1a. The multi-contact relays in this unit are for the purpose of controlling column shift and readout from the various sections of the machine and may be of the type shown in the Cunningham patent.

It may also be explained that the MC—1, the MC—3 and the MC—4 entry receiving devices in addition to being provided with the usual readout sections are provided with supplemental or "doubling" readout sections for reading out from each of these entry receiving devices or accumulators double the amount of the entry set up therein. Such readout devices are designated MCRO—2, MCRO—6 (Fig. 1) and MCRO—8 (Fig. 1a).

The machine also includes two impulse emitters 10 and 11 (Fig. 1) which are driven in the indicated manner.

In the present machine there are nine FC cam contacts designated FC—1 to 9 inclusive on Fig. 1a. The machine also includes cam contacts CC—1 to 3 (Fig. 1) which are driven from the main drive shaft in the indicated manner. The machine also includes an impulse distributor 12 (see Fig. 1). The PR accumulator resetting device controls two sets of contacts, one set designated 14 comprises a pair of contacts which are adapted to be closed upon reset and the other set being a three-blade contact arrangement involving two pairs of contacts 15 and 16. Contacts 15 open upon reset and contacts 16 close upon reset. Upon one of the MC accumulators, for example the MC—3 accumulator, the reset devices control two pairs of contacts designated 17 and 18. Contacts 17 open upon reset and contacts 18 close upon reset.

Figure 2:
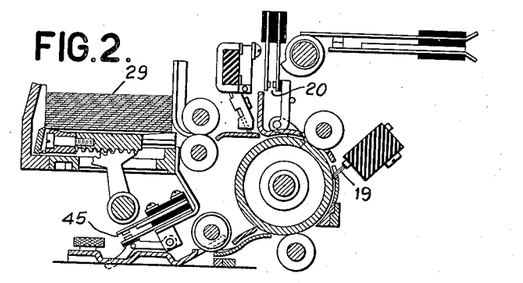
Fig. 2 is a card feed, card handling and sensing section of the machine.

Referring now to Fig. 2, the card handling and sensing section of the machine is generally the same as in the Cunningham Patent No. 1,933,714. The readout or sensing brushes are shown and designated 19. There are also shown card lever contacts 20.

Complete details of the punch are not shown herein as they are substantially the same as the punch described in the Cunningham and Oldenboom patents. A fragment of the punch is shown in Fig. 1a in proximity to the card R in the entering section of the punch.

Operation

Before describing the circuit diagram of the machine, the general mode of the machine will be briefly explained. It will be assumed that the present machine is intended to handle multiplier and mulitplicand entries each of a maximum of three columns. Obviously the machine may have a greater capacity. Upon a card entering the sensing section of the machine, the sensing brushes 19 sense the multiplier and multiplicand fields of the card and enter the multiplier into the MP receiving device and also enter the multiplicand into the MC—1, MC—3, MC—5, MC—7, MC—9 receiving devices. As explained before, the MC—1 accumulator or receiving device has a supplemental or doubling readout section designated MCRO—2. Accordingly, upon the entry of the multiplicand into the MC—1 accumulator, there will be a set up on the MCRO—1 readout section of the amount of the multiplicand itself and upon the MCRO—2 readout there will be a set up of the multiplicand multiplied by two. Upon the entry cycle which immediately follows the operating cycle in which amounts are read from the card there is a further reading out and entering cycle in which double the amount of the multiplicand is read out from the MCRO—2 readout and this double amount is directed and entered into MC—3, MC—4, MC—5 and MC—9. There will accordingly now be set up and standing in MC—3, MC—4, MC—5 and MC—9 amounts which are three times the amount of the multiplicand in MC—3, in MC—5 and MC—9 and twice the amount of the multiplicand in MC—4. Following this cycle, upon the next cycle, there is a further transfer over of double the multiplicand amount into the MC—4 and MC—5 entry receiving devices so that thereafter MC—4 will have four times the amount of the multiplicand set up therein and MC—5 will have five times the amount of the multiplicand set up therein. Concurrently with this transfer there is a readout from the MCRO—6 section of six times the amount of the multiplicand, which amount is directed into the MC—7 and MC—9 entry receiving devices so that upon the completion of the entry operation seven times the amount of the multiplicand and nine times the amount of the multiplicand will be set up in these respective receiving devices.

The machine is now ready to proceed with multiplication, which operation is effected by reading out a multiple of the multiplicand or complete sub-product from a selected readout section of a selected entry receiving device and an entry of such multiple multiplicand amount or sub-product into the products accumulator. This is under the control of the entry in the MP entry receiving device.

After the operation pertaining to one order of the multiplier is effected, there is a further entry operation for succeeding orders of the multiplier. Finally the complete product is in the PR accumulator and the machine is ready to record back upon the record from which the multiplicand and multiplier factors were derived.

It will be understood from the foregoing that the present machine effects multiplication not by creating by partial products as heretofore, but by simple selecting and addition methods. It will be further understood that column shift arrangements are provided to relatively shift the entries of successive sub-products as multiplication proceeds from column to column of the multiplier. A simplified form of cycle controller is also provided to eliminate idle machine cycles for orders of the multiplier where zeros appear. The machine also includes punch controlled contacts which are generally similar to correspondingly located punch controlled contacts in the Cunningham and Oldenboom patents above referred to.

Readout

The readouts associated with the various entry receiving and product accumulating devices are generally similar to those previously used in the art with exception of the readout which is associated with the MC—1, MC—3 and the MC—4 accumulators or receiving devices. These readouts are of identical form and the readout arrangement for MC—1 will be described. It comprises a readout driven directly from the receiving devices and designated MCRO—1 on Fig. 3b of the circuit diagram. Driven from this readout is another readout MCRO—2. Both the MCRO—1 and MCRO—2 readouts are of the so-called dual type. The MCRO—1 readout has one section which is wired for direct readout of the amount of the multiplicand standing in the MC—1 accumulator. This is the section with the segment spots connected to the transverse bus wiring extending to the emitter 10. The MCRO—2 readout is so wired to the emitter 11 that any readout therefrom will be double that of the brush position. For example, if the units brush of the MCRO—2 readout is standing on the spot 7 by tracing the wiring to the emitter 11 it will be noted that there will be an actual readout of 4 which is twice 7 in the units place. However, when the double amounts are to be read out within the range of 5 to 9 the readout from the next higher order column must be increased by one, that is, if there is an entry of 19 and MC—1 the actual amount read out from MCRO—2 must be 38, the tens column reading being 1×2+1=3. This is provided for by extending the readout circuits from the tens, hundreds and higher order columns of the MCRO—2 readout to the extra or piloting section of the MCRO—1 readout. Wiring 22 and 21 is provided for this purpose. It will be noted that wiring 22 extends to spots 5 to 9 inclusive on the extra or piloting section of the MCRO—1 readout and that wiring 21 extends to spots 0 to 4 inclusive of the extra or piloting section of the MCRO—1 readout. Accordingly, the extra section of the MCRO—1 readout pilots the reading to be derived from MCRO—2 increasing the readout therefrom by one in the next higher order column when required.

The special arrangement of wiring from the emitter 11 to the MCRO—2 readout provides for the required doubled amount to be read out. The other section of the MCRO—1 readout is utilized for a direct or straight readout of the amount standing in the related counter. It will be understood that for a direct readout from the regular readout section of MCRO—1 the number 10 emitter is utilized, whereas for a doubled readout from MCRO—2 as piloted by the extra section of MCRO—1, the number 11 emitter is utilized.

The mode of operation of the doubling readout may be understood by considering a typical example. Assume an entry of 19 into MC—1. With such entry the brushes of MCRO—1 and MCRO—2 will both be set on the 9 spot in the units order. Then upon a readout from MCRO—2 a circuit will be established from emitter 11 across the "8" wire to the right hand units order brush of MCRO—2 on the 9 spot, then down through the right hand common strip and via a wire to and through the 2CR—4 contact and to the accumulator. Now considering the tens order from the 3 spot of emitter 11, the transverse wire marked "3" extends to the one segment spot in the tens order of MCRO—2. The brushes engage spots on the 2 and 3 transverse bus lines to the emitter 11, thus establishing circuits to the right hand group of spots to the units order brush of MCRO—1 readout. The potential circuit which is completed depends upon the brush setting on the units order of MCRO—1. Thus on a setting of 5 to 9, the circuit is completed from line 22 to contacts 2CR—3 and thence to the accumulator and on a setting of from zero to 5 the circuit is completed from line 21 to 2CR—3 and thence to the accumulator. Accordingly, on the readout of a double amount, the amount read out in a relatively higher order will be dependent upon the amount read out in a relatively lower order, being augmented by one in the higher order when necessary. Thus for a readout of double 19, the readout would be 38 but if the units order of the amount to be doubled was less than 5, for example, a readout of double 14, the readout would be the amount of 24, there being no augmentation in the tens order.

Circuit diagram

Figure 3A:
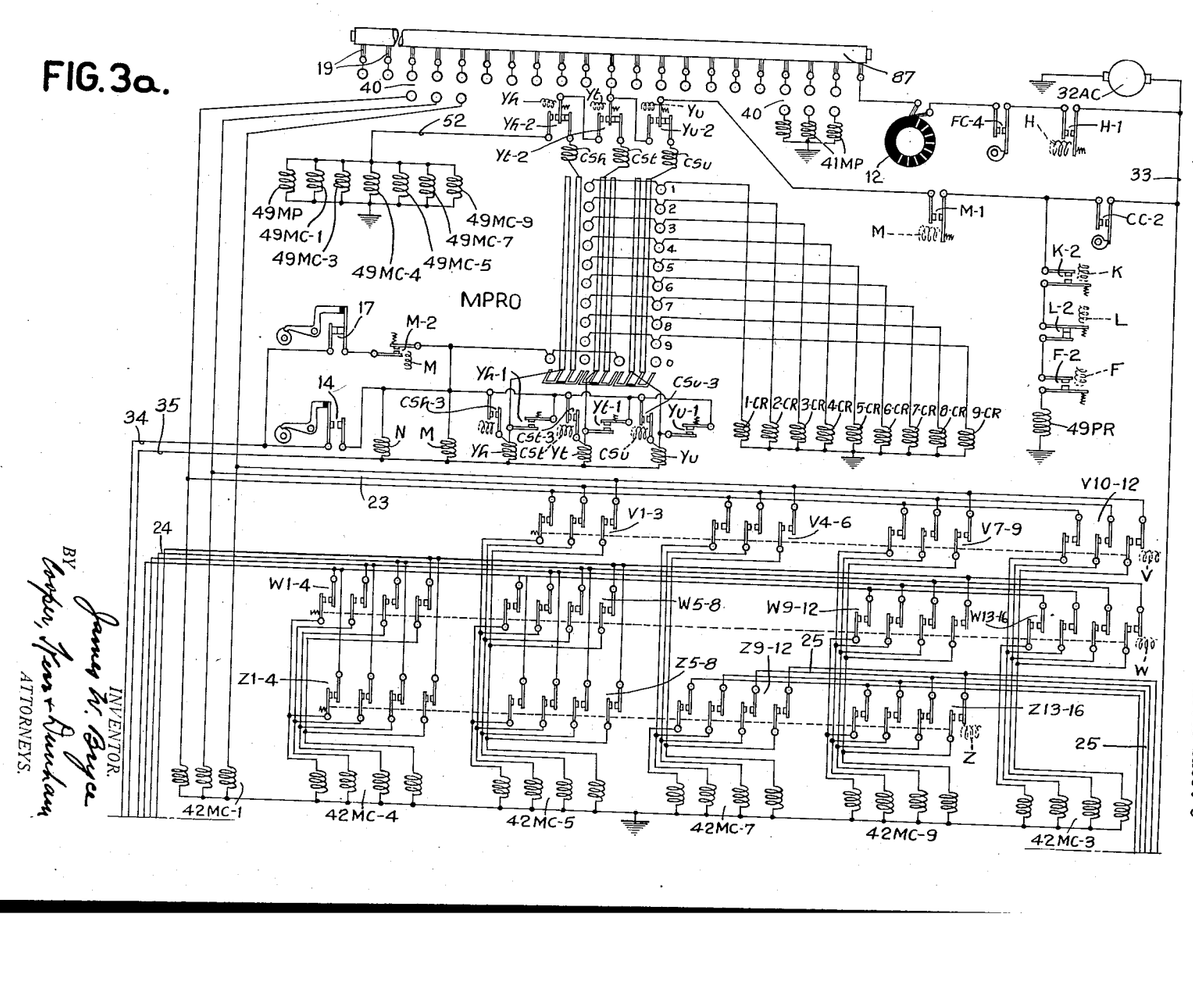
Figs. 3a, 3b and 3c, taken together and arranged vertically in the order named, show the circuit diagram of the machine.
Figure 3B:
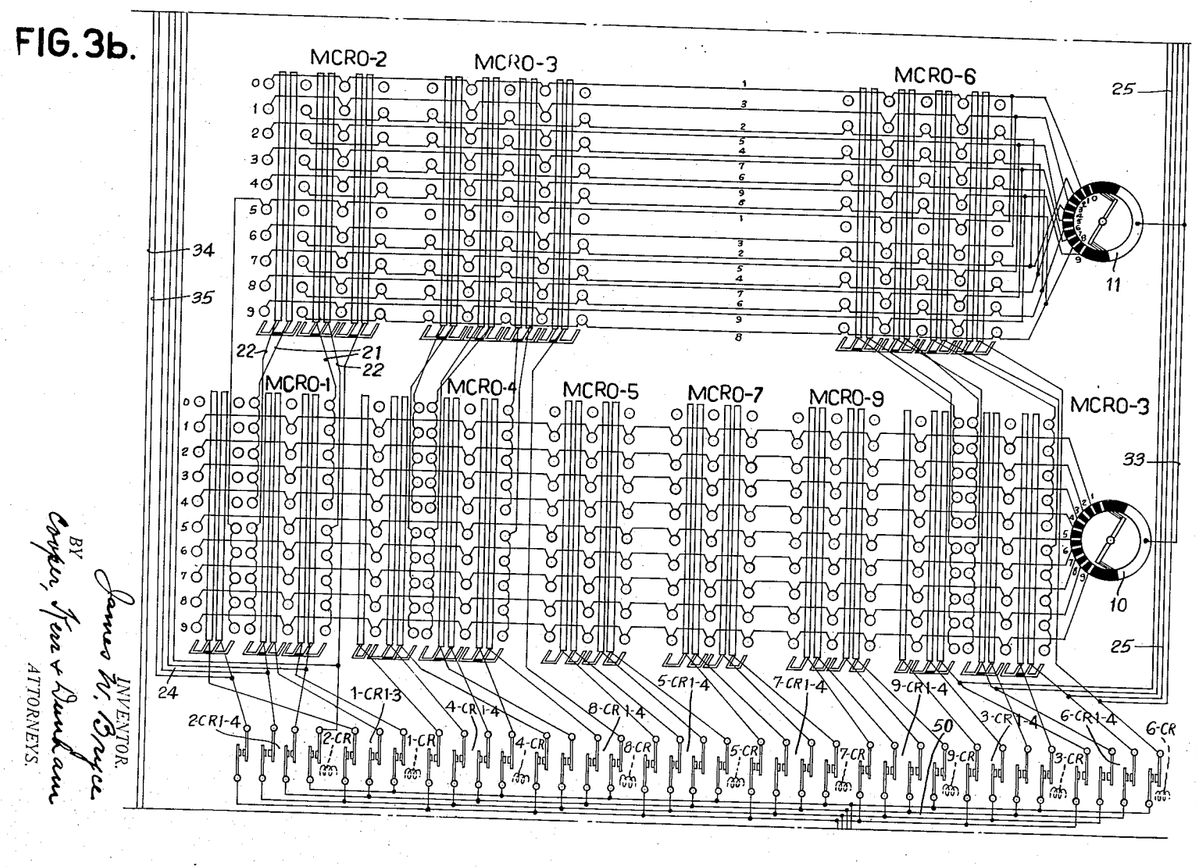
Figure 3C:
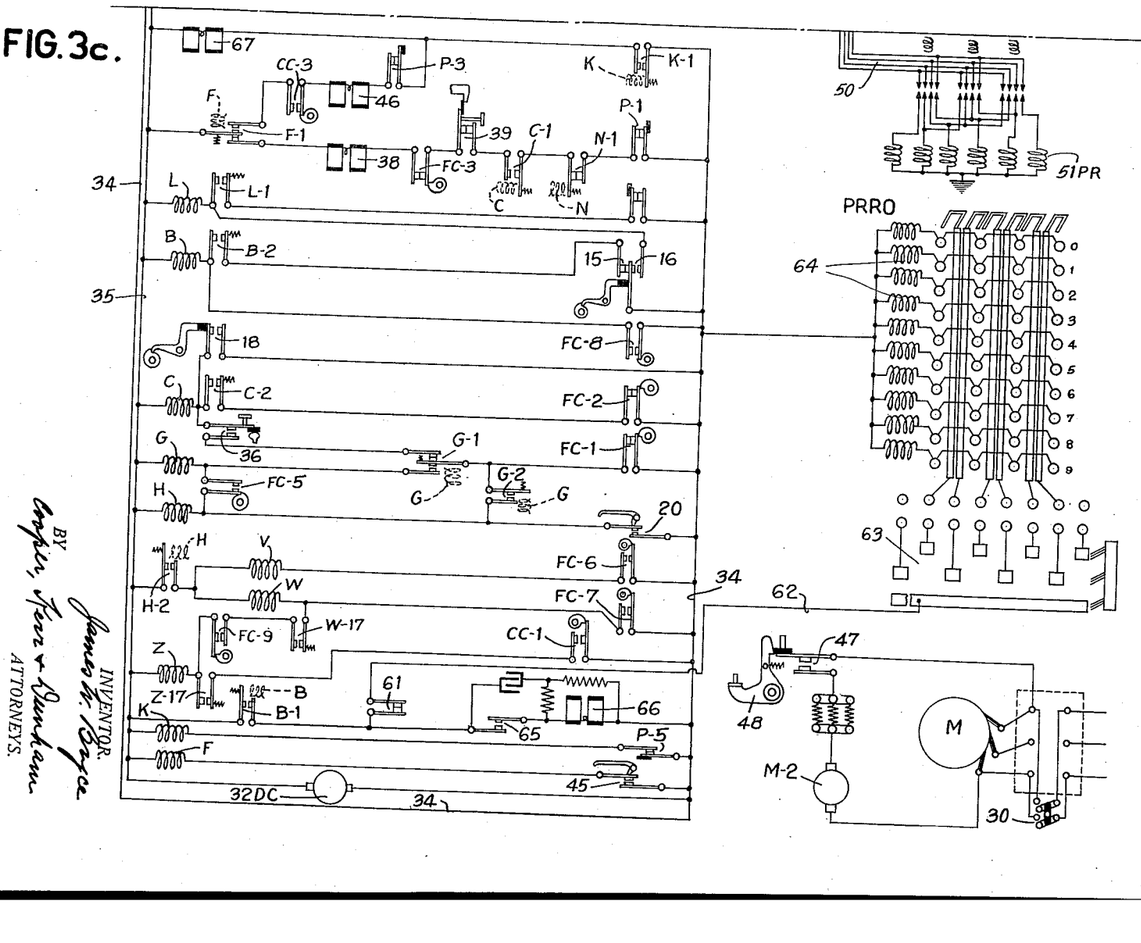
Figure 4:
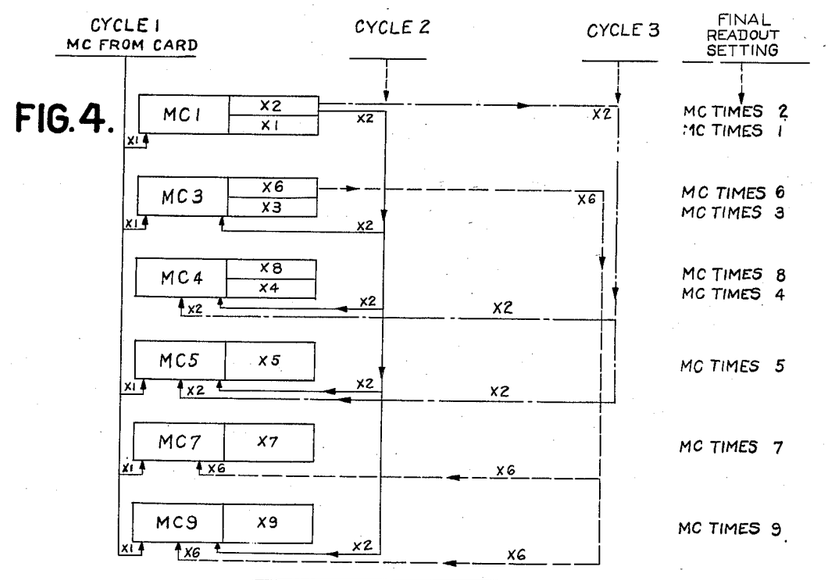
Fig. 4 is a diagram showing the manner in which multiple components of the multiplicand are entered and set up in the machine during three setting up cycles.

It will be assumed that proper perforated cards are in the supply magazine 29 of the card handling section of the machine (see Fig. 2). To start the machine in operation, switch 30 (Fig. 3c) is first closed to supply current for the main driving motor M and for the punch driving motor M—2. Rotation of the main driving motor M puts into operation the A. C.-D. C. generator 32 (Figs. 1, 3a and 3c). The A. C. end of this generator supplies current to bus 33 and to ground and the D. C. end of the generator supplies current to buses 34 and 35 (Fig. 3c). The start key is now depressed to close start key contacts 36 and to complete a circuit from the 35 side of the D. C. line through relay coil C, relay contacts G—1 now closed, cam contacts FC—1, to the 34 side of the D. C. line. The stick circuit is established through relay contacts C—2 and cam contacts FC—2 now closed. Energization of relay coil C also closes relay contacts C—1 establishing a circuit from the 35 side of the D. C. line, through relay contacts F—1, through card feed clutch magnet 38 (see also Fig. 1a), through cam contacts FC—3 now closed, through stop key contacts 39 now closed, through relay contacts C—1 now closed, through relay contacts N—1 now closed, through punch controlled contacts P—1 now closed and back to line 34. As in previous machines the start key must be kept depressed for the first four counter cycles in starting up a run or alternatively it may be depressed and released and again depressed. Starting operations are prevented until the feed rack of the punch is in proper right hand position, this having been provided for by contacts P—1.

Before starting up the machine the proper plug connections will be made at plug board 40 (see Fig. 3a) so that the amount of the multiplier will be entered from the multiplier field of the card into the MP receiving device. 41MP designate the counter magnets of the MP accumulator. Suitable plug connections are also made to enter the amount of the multiplicand directly into the MC—1 accumulator. 42MC—1 designate the counter magnets of the MC—1 accumulator.

It will be noted that branch entry circuits generally designated 23 are provided which extend to multi-contacts arranged in groups and respectively designated V—1—3, V—4—6, V—7—9 and V—10—12. These multi-contacts are controlled by energization of their corresponding relay coil V. With the coil V energized in a manner to be subsequently described, there will be a concurrent entry of the multiplicand amount into MC—5, MC—7, MC—9 and MC—3 with the entry into MC—1. At the end of the first card feed cycle the first card will have been advanced to a point in which it is about to be read by the sensing brushes 19. During the second card feed cycle the card traverses the sensing brushes 19 and the multiplicand and multiplier amounts are read from the card and entered into the proper receiving devices. The multiplicand, it will be understood in this cycle, is entered into MC—1, MC—5, MC—7, MC—9 and MC—3. At the end of the first card feeding cycle the lower card lever contacts 20 (see Figs. 2 and 3c) will be closed by the card causing energization of relay coil H (Fig. 3c) and causing the relay contacts H—1 to close. As the second card feed cycle ensues, the card is carried past the brushes 19 and the factor amounts are entered into the multiplier and proper multiplicand counters. The energization of relay coil H has also caused closure of relay contacts H—2. With relay contacts H—2 closed at the proper time in this cycle upon closure of cam contacts FC—6 relay coil V will become energized and remain energized long enough to permit the multiplicand entry to also be made into the proper other receiving devices, viz. into MC—5, MC—7, MC—9 and MC—3.

The entry circuits will now be traced. Current flows from the A. C. line 33 (Fig. 3a) through relay contacts H—1 now closed, through cam contacts FC—4 which close at the proper time in the cycle, through impulse distributor 12, through the card and transfer roll 87, thence through the brushes 19 pertaining to the multiplier, through the plug connections at plug board 40 to the multiplier counter magnets 41MP. Likewise entries of the multiplicand are made directly into MC1 and through the now closed multi-contacts V—1 to 12 inclusive into MC—5, MC—7, MC—9 and MC—3.

The hand initiating control is cut off after the machine operations have been properly started. This is brought about in the following manner. At the beginning of the second card feed cycle the closure of cam contacts FC—5 (Fig. 3c) will cause relay G to become energized. Current flows from line 35, through relay coil G, through cam contacts FC—5, through the card lever contacts 20 now closed and back to the other side of the line. The energization of relay coil G will shift the relay contacts G—I to a reverse position interrupting the circuit to the start key contacts 36 but maintaining the circuit to cam contacts FC—I. The energization of relay coil G will also close relay contacts G—2 and establish a stick circuit for relay coils G and H through either the FCI cam contacts or the card lever contacts 20. It may be explained that the making time of cam contacts FC—I overlaps the time when card lever contacts 20 open between cards. On the following counter cycle, provision is made for reading out double the amount of the multiplicand from the MCRO—2 readout and entering this doubled multiplicand amount into certain other of the multiplicand entry receiving devices. It may be explained that after the entry of the multiplicand itself into the MC—5, MC—7, MC—9 and MC—3, the relay contacts V—1 to 12 inclusive open up upon the opening of cam contacts FC—6 which brings about de-energization of relay coil V. Shortly thereafter cam contacts FC—7 close to energize relay coil W. Relay coil W (see Fig. 3a) controls relay contacts W—I to 16 inclusive and upon closure of these contacts and upon operation of the emitter 11 double the amount of the multiplicand will be read out from the MCRO—2 readout section and entered into MC—4, MC—5, MC—9 and MC—3. Following this entry operation the cam contacts FC—7 reopen to de-energize relay coil W.

Before describing the operations which take place on the next counter cycle, it may be explained that while relay coil W was energized supplemental relay contacts W—17 became closed. Accordingly, upon closure of cam contacts FC—9, a circuit is established to energize relay coil Z (Fig. 3c). Relay coil Z once energized, is maintained by a stick circuit through relay contacts Z—17 and cam contacts CC—I. These contacts hold over the energization of relay coil Z into the following counter cycle. The energization of relay coil Z closes relay contacts Z—I to 16 inclusive (Fig. 3a) which set of contacts are closed during the third setting up cycle and with emitter 11 in operation there will be a readout of two times the amount of the multiplicand from the MCRO—2 readout and the entry of twice the multiplicand into MC—4 and MC—5. There will also be a readout of six times the amount of the multiplicand from the MCRO—6 readout and the entry of such amount into MC—7 and MC—9. It may be explained that the supply lines for entering twice the amount of the multiplicand on the second setting up cycle are generally designated 24 (Figs. 3a and 3b), such lines extending to relay contacts W—I to 16 and also extend to the outgoing lines from the MCRO—2 readout. Such lines 24 are also used during the third counter cycle and supplemental lines generally designated 25 are likewise used on the third setting up cycle. Such supplemental lines extend to the MCRO—6 outgoing readout lines (see Fig. 3b).

By the foregoing operations all multiples of the entered multiplicand will be set up for readout from the various readout sections of the various MC entry devices.

The card is fed through the card handling section of the machine and ultimately such card passes to the R position in the punch closing card lever contacts 45 (see Figs. 2 and 3c), energizing relay coil F and shifting relay contacts F—I to reverse position from that shown.

In starting up the machine the usual punch racks (shown in the Cunningham and Oldenboom patents) are in extreme outer position and accordingly contacts P—2, P—3 and P—5 are closed. With contacts P—5 closed, relay coil K will be energized and relay contacts K—I will be in closed position. Upon the shifting of relay contacts F—I and upon closure of cam contacts CC—3 a circuit will be established to the punch clutch magnet 46. This circuit is completed through punch contacts P—3 now closed and relay contacts K—I also closed. Energization of the punch clutch magnet 46 will cause closure of contacts 47 which become latched closed by a latch 48. Accordingly, current supply is provided for the punch driving motor M—2. The card which has been previously read and which is in the punching unit in the R position is now advanced through the punch unit to a position in which punching is to commence.

According to the present invention, multiplication by the readout of selected multiples of the entered multiplicand, i. e. by sub-products and the set up of the cycle controller is initiated by the reset of the products accumulator. The PR accumulator reset is initiated as follows: Energization of relay coils F and K in the manner previously explained has caused closure of relay contacts F—2 and K—2 (Fig. 3a). Upon closure of cam contacts CC—2 current flows from line 33, through CC—2, through relay contacts K—2, through relay contacts L—2, through relay contacts F—2, through the 49PR reset magnet and back to ground. Energization of 49PR initiates the resetting of the PR accumulator (Fig. 1). During such reset, reset contacts 16 (Figs. 1 and 3c) close and a circuit is established to relay coil L causing opening of contacts L—2 (Fig. 3a) to prevent a repetition of PR reset. A stick circuit is established for relay coil L through relay contacts L—I. Such circuit extends to the other side of the line through punch contacts P—2. At the proper time in the cycle of operation the punch contacts P—2 open to cause the relay coil L to become de-energized. The machine is now ready to set up the cycle controller and to follow with the multiplying operation by addition of selected multiples of the entered multiplicand. Upon reset of the PR accumulator a circuit is established traced as follows: From the 34 side of the D. C. line (Fig. 3a), through the reset contacts 14 of the PR accumulator, through relay coils M and N and back to the other side of the line 35. The energization of relay coil M closes relay contacts M—I and M—2. Relay contacts M—2 establish a stick circuit for relay coils M and N through the now closed multiplicand reset contacts 17.

Figure 5:
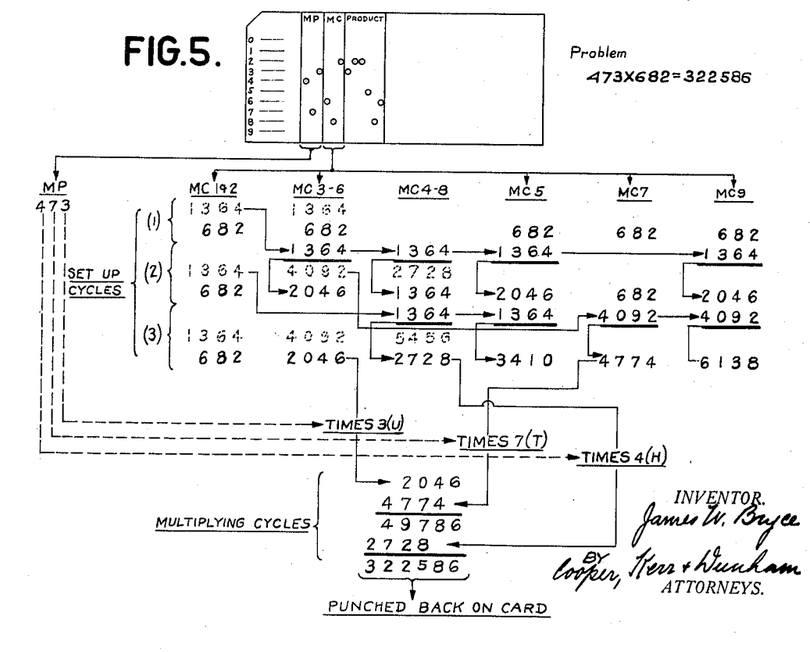
Fig. 5 is a view showing the manner in which a typical computation is performed by the machine.

It will be assumed that the computation being performed by the machine is that of multiplying 682 by 473. In the manner previously explained the amount 682 will be set up in MC—I, double this amount being available to be read out from the MCRO—2 readout, this amount being 1364. See the illustrated computation Fig. 5. The dotted line figures being the amount available to be read out from the times 2 or "doubling" readout section. The entries on successive set up cycles are shown on the following lines designated 2 and 3 in the typical computation (Fig. 5). After the set up cycles have been completed to set up representations of the various multiples of the entered multiplicand or sub-products in the various MC entry devices and upon their various readout devices, the machine is ready to carry out the entry operations and obtain the result of multiplication. The multiplier of 473 will be set up in the MP entry device and the first operation of actual computing is to effect a multiplication by 3 in the units order. It may be explained that the MPRO readout has a cycle controller associated with it which includes Y relay coils (Fig. 3a), stick relay contacts Yu—1, etc., and transfer relay contacts Yu—2, etc. The cycle controller is arranged to skip computing cycles where zeros occur in a column or columns of the multiplier.

With the foregoing computation the brush in the units order of the MPRO readout will be standing upon 3. Accordingly, upon closure of cam contacts CC—2 (Fig. 3a) current will flow from the A. C. line 33 through CC—2, through relay contacts M—1 now closed, through the Yu—2 transfer contact now in the position shown, through the CSu column shift relay magnet, through the units order brush to the coil of a relay designated 3CR to ground. The prefix "3" on the CR coil designates that the readout is to be for a multiplication by 3. The energization of 3CR closes the group of relay contacts designated 3CR—1 to 4 (Fig. 3b). With relay coil 3CR energized the related contacts 3CR—1 to 4 (Fig. 3b) will close and upon operation of the emitter 11 a readout of three times the amount of the multiplicand will flow out from the related MCRO—3 readout device and flow to lines 50. Such lines extend to column shift relay contacts CSu (Fig. 3c), which will also be closed at this time and after flowing through the column shift contacts the entries will flow to the counter magnets 51PR. Accordingly, three times the amount of the multiplicand will be entered into the PR accumulator. Upon the operation of the CSu relay an extra contact CSu—3 (Fig. 3a) will close to energize the Yu relay coil. This relay is maintained energized through its stick contacts Yu—1 (Fig. 3a) and also its energization causes the transfer contacts Yu—2 to shift. Now upon the next counter cycle when CC—2 again closes, the circuit in place of extending to CSu as heretofore extends to CSt, there being an amount in the tens order of the multiplier. Such circuit extends through the brush of the MPRO readout which is now standing on 7 and to the 7CR relay coil. 7CR controls the closure of relay contacts 7CR—1 to 4 (Fig. 3b) so that upon this cycle there will be a readout of seven times the amount of the multiplicand from the readout section MCRO—7 and there will be an entry of this amount into the products accumulator in shifted over columnar relation therein. The same operations follow for the last order of the multiplier. After the entries of all sub-products are completed all the Y relay coils will have become energized and all of the transfer contacts Y—2, etc. will be in shifted over position. Accordingly, on the next cycle cam contacts CC—2 close and a circuit will be completed through all of the Y—2 transfer contacts, through a wire 52, to energize the reset magnets for the multiplier accumulator and the reset magnets for all of the multiplicand accumulators. These are designated 49MP and 49MC—1, etc. (Fig. 3a). The multiplier accumulator and the various multiplicand accumulators will now be reset.

Upon reset of the MC—3 accumulator, reset contacts 17 will open to break the stick circuit for relay coils M and N and for all the Y coils, thus preparing the cycle controller for a new entry from the following card. The reset of the multiplicand accumulator MC—3 also causes closure of reset contacts 18 (Fig. 3c) which causes the energization of relay coil C. Energization of relay coil C causes closure of relay contacts C—1 and there is a re-initiated energization of the card feed clutch magnet 38 in the manner previously described.

The machine is now ready to punch back the product on the record card, which operation is initiated in the following manner. Early in the re-initiation of the card feed cycle, cam contacts FC—8 (Fig. 3c) close, energizing relay coil B, closing stick contacts B—2 and providing a stick circuit for relay coil B, through the PR reset contacts 15 now closed. The energization of relay coil B also closes relay contacts B—1. Current will flow from line 35 through B—1 now closed, through the punch escapement contacts 61, via line 62 to the readout strip 63. With the current thus supplied to the readout strip and with the brush of the readout strip standing on the first of the spots at which punching is to commence, the punching operation will start, there being a readout from the PRRO readout and an energization of the punch selector magnet 64. The closure of relay contacts B—1 (Fig. 3c) also supplies current to contact 65 in the punch which contacts are closed by interposer action to supply current to the punch operating magnet 66. Punching now proceeds and will continue until the complete product is read out and punched. When the punching operation is completed contacts P—5 will become closed, energizing relay coil K and closing relay contacts K—1 to establish a circuit to the ejector magnet 67. The punched card will then be ejected from the punch. A new operation will then be initiated for the succeeding record card. Such succeeding operation is initiated by the closure of relay contacts K—2 and F—2 and upon reset of the PR accumulator as hereinbefore described. It may be explained that upon PR reset contacts 15 open to break the stick circuit for a relay coil B and cause relay contacts B—1 to open the circuit to the punch operating magnets and to cut off the circuits to the readout strip 63 of the punch.

Figure 6:
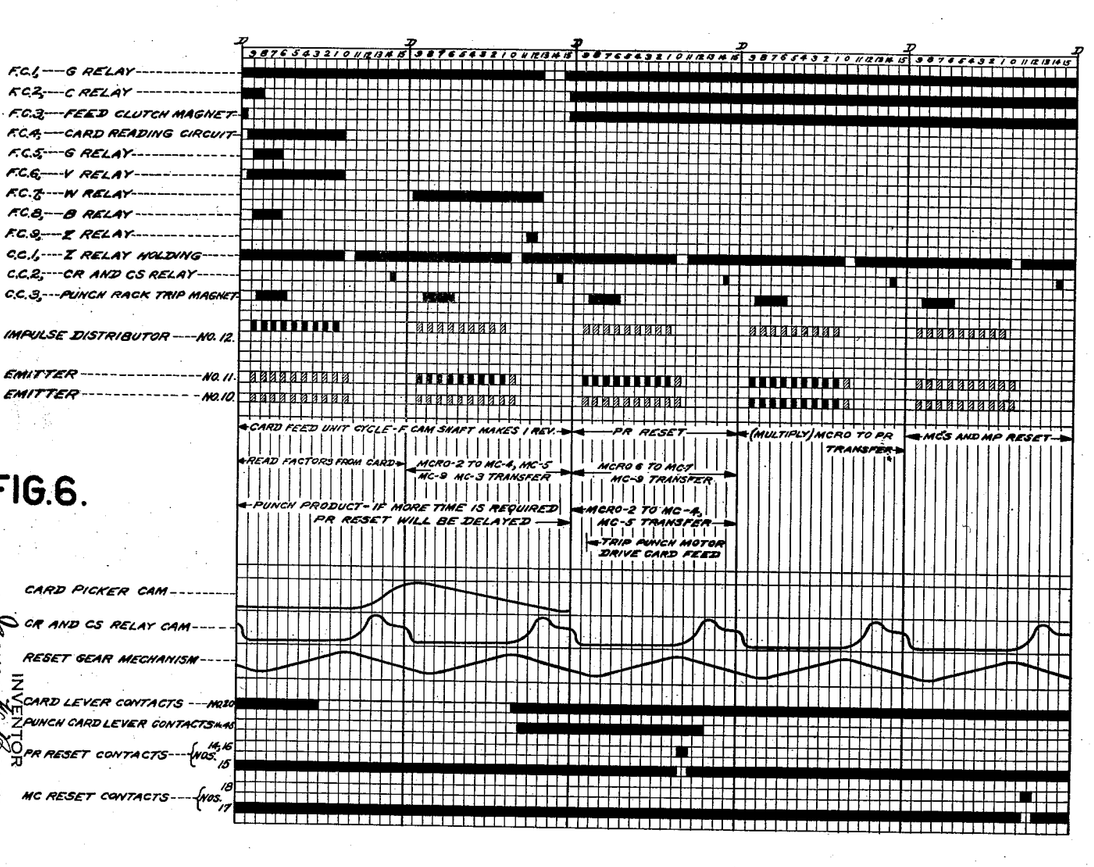
Fig. 6 is a view showing the timing diagram of various cam contacts of the machine and this view shows the sequence of certain cycles of operation as performed by the machine.

The timing diagram (Fig. 6), shows time, various operations of cam contacts, etc. In this timing diagram, the multiplying cycle has been considered as comprising a single cycle, viz. the second cycle from the extreme right of Fig. 6. It will be appreciated, however, that with multiple significant digit multiplier amounts that the number of the multiplying cycles would be increased over that shown in the timing diagram. For the purpose of clarity in the claim terminology, the receiving devices MC—1, MC—3, MC—4, MC—5, MC—7 and MC—9, will be termed "amount receiving means or devices". It will be understood that all of the foregoing amount receiving devices ultimately have a setting therein of amounts related to the multiplicand, i. e. multiples of the multiplicand. It will be further understood that certain of the foregoing devices receive original multiplicand entries, viz. MC—1, MC—3, MC—5, MC—7 and MC—9. While such latter devices may be aptly termed "multiplicand receiving means or devices", the other device MC—4, while receiving transferred entries related to and constituting multiples of the multiplicand does not receive an original multiplicand entry per se. These various receiving devices or means will be accordingly generically designated "amount receiving devices". It will be further understood that by entries into these devices, which entries may comprise transferred and/or original entries, that an incomplete series of an arithmetical progression is set up. Such incomplete series is completed by the doubling readouts. Thus the incomplete series of terms of the progression, MC×1, MC×3, MC×4, MC×5, MC×7 and MC×9, are set up by transferred and/or original entries made into the receiving devices whereas the lacking terms of the foregoing series, viz. MC×2, MC×6, and MC×8, are set up by the doubling readout devices. The various readouts comprise representing means for all of the digital multiplicand multiples, that is to say, if a tens notation is involved in the calculation, readout devices or representing means are provided for all of the multiples based upon the digits from 1 to 9. Such multiples also constitute complete sub-products.

The control means for original entries into the amount receiving means comprise the brushes and the control means for transferred entries comprising the readout means or representing means. The particular representing means used for controlling transferred entries are here shown as being of a type from which a multiple of an amount standing in the positioning receiving means may be derived. The representing means includes some representing means for direct readout of amounts and others for readout of multiple amounts.

What I claim is:

1. A multiplying machine comprising in combination, a number of accumulators for multiples of the multiplicand, means for entering a multiplicand into certain of said accumulators, means for transferring amounts based upon the multiplicand amounts entered in the said certain accumulators to other of said accumulators so that the accumulators will register an incomplete series of multiples of the multiplicand, multiplicand multiple supplying means for supplying representations of each of all of the digital multiples of the multiplicand including the registered multiples and other multiples of the series, said supplying means controlling the aforesaid transferring means and including settable elements for each multiple set by a related receiving means, with a plurality of settable elements related to different multiplicand multiples commonly set by certain of said accumulators whereby the supplying means having commonly set elements supply representations of a multiplicand multiple in the related accumulator and a multiple of such multiple, multiplier factor manifesting means, multiplicand multiple and selecting routing means controlled thereby for automatically selecting one of said multiples in accordance with each digit of a manifested multiplier for routed entry into product accumulating means, and product accumulating means for summing the selected multiples.

2. A multiplying machine comprising in combination, devices for predetermining multiplicand multiples, including a plurality of receiving and accumulating means set according to the multiplicand and multiples thereof, and multiplicand multiple supplying means for supplying representations of each of all of the complete digital multiples of the multiplicand, including settable elements for each of all of the different digital multiples of a multiplicand and from which supplying means any selected complete multiplicand multiple based upon a received multiplicand may be derived, means including said receiving and accumulating means for setting up all of said settable elements for all different digital multiples before any multiple selection is effected, said machine also comprising result calculating mechanism including multiplier factor manifesting means set to represent a multiplier and result receiving means and means controlled by the multiplier factor manifesting means to connect the multiplicand multiple supplying means corresponding to any manifested multiplier digit to the result receiving means so that any complete available multiple may be entered by a single entry and means to derive such multiple from the supplying means and to enter it into the result receiving means.

3. A machine according to claim 2 adapted for multiplying calculations of numbers expressed in the decimal notation, wherein the multiplicand multiple supplying means comprises nine different supplying devices each supplying a different complete digital multiple of the multiplicand.

4. A machine according to claim 2 wherein means are provided to enter the multiplier and the multiplicand in the respective manifesting means and in predetermined receiving and accumulating means, and wherein cyclically operable means are provided to render available the multiplicand multiples in said supplying means following multiplier and multiplicand entry.

5. A machine according to claim 2 wherein means are provided to enter the multiplier and the multiplicand in the respective manifesting means and in predetermined receiving and accumulating means, and wherein cyclically operable means are provided to render available the multiplicand multiples in said supplying means following multiplier and multiplicand entry in a fixed number of cycles, and wherein further cyclically operable means are provided for subsequently initiating and effecting operation of the multiplicand multiple deriving and entering means through a number of cycles corresponding to the number of significant digits in the manifested multiplier.

6. Multiplying machine including nine electrical readout means for concurrently making available representations of nine different complete digital multiplicand multiples, constituting the multiplicand times each of the nine significant digits of the decimal notation, each readout including settable elements, a plurality of amount receiving electrically controlled accumulators for positioning the settable elements of such readouts, means for introducing a multiplicand value in predetermined ones of said accumulators and means for automatically transferring multiples from certain accumulator controlled readouts in which the multiplicand was entered to other accumulators for setting the settable elements of said nine readouts so that representations of all different digital complete multiples of the introduced multiplicand are available for readout therefrom.

7. Machine according to claim 6 wherein the electrically controlled accumulators for positioning the settable elements of the readouts are less in number than the number of readouts, some of said accumulators each positioning a plurality of readouts for distinct multiples.

8. A pre-computing apparatus for a multiplying machine of the type wherein complete multiples of an entered multiplicand are selectively entered into result receiving means under the control of a multiplier factor manifesting means, said pre-computing apparatus comprising in combination a plurality of representation supplying means for concurrently rendering available representations of all of the different complete digital multiples of a multiplicand, said multiples comprising the multiplicand times each significant digit of a notation, said representation supplying means including settable elements, a plurality of receiving and accumulating devices for controlling and effecting the setting of said settable elements, means to enter the multiplicand in certain of said receiving and accumulating devices, and means effective following the entry of the multiplicand for entering in automatic succession, under control of some of the representation supplying means multiples of the entered multiplicand in certain of said receiving and accumulating devices until all of the different multiplicand multiples are rendered available in the supplying means therefor.

9. A machine according to claim 8 wherein the representation supplying means comprise electrical readouts, and the receiving and accumulating devices are electrically controlled to receive a multiplicand and multiples thereof, and wherein the readouts of some of said accumulating devices render available multiples of the amount standing on said devices.

10. In an accounting machine for effecting multiplying computations comprising control means for determining multiplier and multiplicand factor entries, a plural order receiving device for a multiplier factor controlled by its control means, a plurality of amount receiving and accumulating devices, each having readout means positioned thereby, said readout means positioned by certain of the receiving devices including multiple representation supplying elements so that representations of a multiple of an amount standing in a related receiving device may be read out therefrom, means for causing amounts to be set up upon the amount receiving and accumulating devices and for rendering available for readout from the readout means thereof representations of all of the digital multiples of a multiplicand amount, said last mentioned means including means to bring about original entries with such entries being controlled by the control means for determining multiplicand entries, and means to cause transfer entries to certain amount receiving and accumulating devices from the readout means associated with other receiving devices, product accumulating means adapted to receive sub-products, routing means controlled by the digital orders of the multiplier entry receiving device for controlling the selective entry into the product accumulating device of one selected multiple of the multiplicand for each significant multiplier digit, and means for affecting the multiple entries.

11. In an accounting machine having means controlling the entry of factors thereinto, means receiving the multiplier factor, receiving means for the multiplicand factor and result receiving means; the combination of multiplicand multiple supplying means from which representations of each of all of the digital multiples of the multiplicand may be directly read out, said supplying means including settable elements for each multiple, means for setting the aforesaid last mentioned means so that representations of the multiplicand and multiples thereof may be derived therefrom, said means including the aforesaid multiplicand receiving means and supplemental accumulative type receiving means, means to direct the entry of the multiplicand amount into said multiplicand factor receiving means and into certain of said accumulative type receiving means from the multiplicand entry control means, means to cause said supplemental accumulative type receiving means to receive transfer entries under the control of multiple representation supplying means whose settable elements are set by other receiving means, means controlled by the multiplier receiving means including entry routing and column shift means for selectively directing the entry or entries of a pre-available multiple or multiples, one for each multiplier digit, from the multiplicand multiple supplying means into the result receiving means, and means for causing such entry or entries to be made.

12. A multiplying machine including in combination, plural supplying means for supplying representations of each of all of the complete digital multiples of a multiplicand, including settable elements for each different multiple and means for setting said settable elements so that representations of all of the different multiples may be supplied by the supplying means, said last mentioned setting means comprising accumulative type entry receiving means less in number than the number of supplying means for the different digital multiples of the multiplicand, means to enter the multiplicand in certain of said entry receiving means, means to subsequently enter multiples of the multiplicand in predetermined ones of said entry receiving means under control of representation supplying means of other receiving means to form all digital multiples of the multiplicand, means for accumulating together selected multiples selectively derived from the multiple representation supplying means, a multiplier factor manifesting means which manifests an entered multiplier, and routing means controlled thereby for selectively routing a multiplicand multiple for each manifested significant multiplier digit from the representation supplying means to the means for accumulating selected multiples.

13. In a machine of the class described, the combination of plural means to receive and accumulate multiples of a multiplicand, means to store a multiplier, means to enter a multiplier therein, means to enter the multiplicand in certain of said receiving and accumulating means, and means to enter multiples of the multiplicand in predetermined ones of said receiving and accumulating means, means to supply representations of each of all of the digital complete multiples of the multiplicand, said last mentioned supplying means having settable elements set by the multiplicand multiple receiving and accumulating means, certain of said supplying means controlling entries of multiplicand multiples effected by said last entry means, means to read each denominational digit of the multiplier, means to accumulate multiples of the multiplicand to obtain a complete product, and means rendered effective by the reading means as each denominational digit of the multiplier is read to transmit the multiple of the multiplicand corresponding to each read digit of the multiplier from the multiplicand multiple supplying means to the accumulating means.

14. In a multiplying machine, a multiplier factor receiving device, and plural means for receiving and accumulating a multiplicand and multiples thereof, readout means controlled by said receiving and accumulating means for reading out all digital multiples of the entered multiplicand, means for effecting an entry of the multiplier in said device, means for effecting an entry of a multiplicand in predetermined ones of said receiving and accumulating means, means for causing entries of multiples based on the entered multiplicand in certain of said receiving and accumulating means under control of certain readout means for forming predetermined multiples in said receiving and accumulating means and rendering available for readout from the readout means all digital multiplicand multiples, a product accumulator, and means controlled by said multiplier factor receiving device in accordance with the digital values represented therein for causing entry of a single multiplicand multiple in said accumulator under control of said readout means for each multiplier digit.

JAMES W. BRYCE.

CERTIFICATE OF CORRECTION.

Patent No. 2,192,003.  February 27, 1940.

JAMES W. BRYCE.

It is hereby certified that error appears in the printed specification of the above numbered patent requiring correction as follows: Page 3, second column, line 38, for "devices" read device; line 59, for "and" read into; page 7, first column, line 55, claim 1, for "and selecting routing" read selecting and routing; page 9, second column, line 5, claim 14, after "digit" and before the period, insert value; and that the said Letters Patent should be read with this correction therein that the same may conform to the record of the case in the Patent Office.

Signed and sealed this 2nd day of April, A. D. 1940.

(Seal)   Henry Van Arsdale,
Acting Commissioner of Patents.